May 23, 1933.     G. E. BLINN     1,910,820
DETECTOR FOR HIDDEN METAL
Filed May 13, 1931

INVENTOR
Glenn E. Blinn
BY
Pennie, Davis, Marvin & Edmonds,
ATTORNEYS

Patented May 23, 1933

1,910,820

UNITED STATES PATENT OFFICE

GLENN E. BLINN, OF NEW YORK, N. Y., ASSIGNOR TO HERVEY S. WALKER, OF ARDMORE, PENNSYLVANIA

DETECTOR FOR HIDDEN METAL

Application filed May 13, 1931. Serial No. 537,032.

This invention relates to devices for discovering the location of concealed metal objects by electrical means and is concerned more particularly with a novel device of the type described which is of simple, compact construction, easily moved about and of special utility in discovering such concealed objects as the ducts and floor boxes of an under-floor duct system.

At the present time, it is the customary practice to install elaborate duct systems in the floors of modern concrete buildings, these ducts serving for the distribution of wiring for electrical service of different kinds. In such systems, the ducts are buried beneath the floor to a substantial distance and in some systems the location of the ducts can only be ascertained by reference to the building plans. In other systems such as that described in Patent No. 1,592,548, issued July 13, 1926, the ducts are provided with outlets on a uniform spacing, which outlets extend up toward and are intended to terminate flush with the floor surface. It occasionally happens that the tops of the outlets of the system of the patent are covered by a thin film of floor material and usually, even though the outlets terminate flush with the floor, they are concealed by the floor covering of linoleum or the like. As a consequence, it is sometimes difficult, even with the patented system, to determine the location of the ducts without referring to the plans and making measurements from partitions, columns, or the like.

The present invention is accordingly directed to the provision of a simple, inexpensive mechanism, electrically operated, by which it is possible to determine accurately the location of concealed metal objects such as underfloor ducts above referred to.

The new device involves producing an alternating magnetic field, either of the continuous wave or oscillating types, and then detecting any distortion of the field which results from metal objects within the field. In the device, the field is set up by a coil carrying electric current and a second coil is disposed at right angles to the direction of flux through the first coil, so that little or no current flows through the second coil by induction in the absence of disturbing influences. However, if the first coil is moved into the vicinity of a metal object and under such circumstances that the object causes a distortion of the flux in the field produced by that coil, current is induced to flow through the second coil, and the flow of current is detected by suitable means, such as a telephone receiver or galvanometer. The magnitude of the signal given by the receiver or galvanometer increases as the coils approach the concealed object, and by moving the apparatus in the vicinity of the object, the location of the latter may be determined with great accuracy.

For a better understanding of the invention, reference may be had to the accompanying drawing, in which Fig. 1 is a plan view of an embodiment of the device, showing the wiring;

Figure 1:
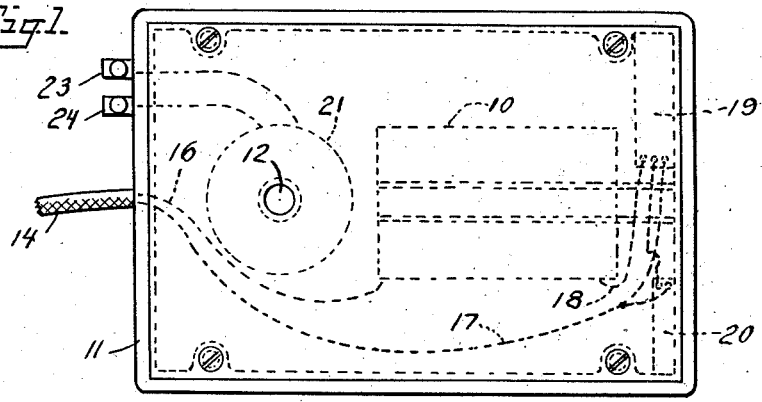
Figure 2:
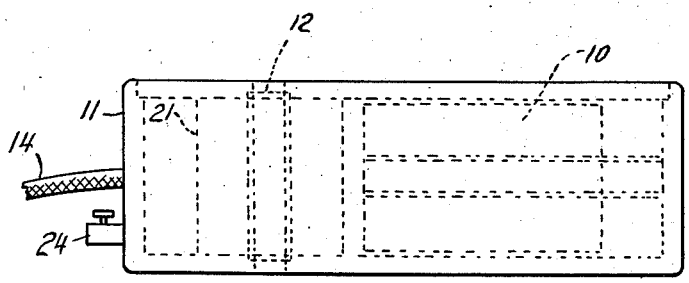
Fig. 2 is a side view of the device showing only the position of the coils.
Figure 3:
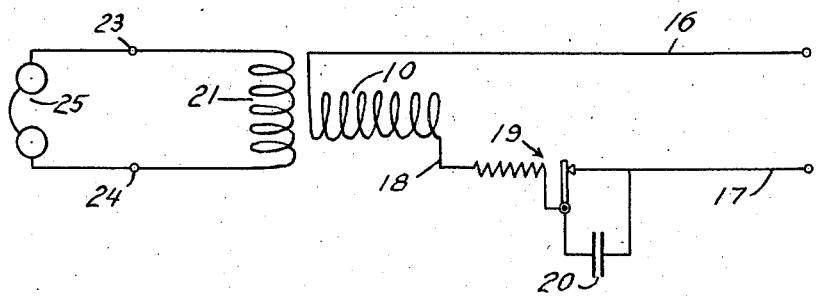
Fig. 3 is a wiring diagram of the device.

As illustrated in the drawing, the device includes a primary coil 10 mounted in a casing 11 in such a position that the axis thereof is parallel to the bottom of the casing. The coil is supplied with current from an outside source of current through a conductor cable 14, and one lead wire 16 inside the box connects the cable to one terminal of the coil and lead wires 17 and 18 connect the cable to the other coil terminal through a buzzer 19, a condenser 20 being connected across the contacts of the buzzer in the usual manner. With this construction either alternating or direct current may be supplied to the coil, as for example from the supply wiring of the building for the electric lights.

A secondary coil 21 is also mounted in the casing 11, and the axis of the secondary coil is at right angles to that of the primary coil 10. The position of this coil within the casing is indicated by openings 12 in opposite walls of the casing in alignment with the open core of the coil and the hole through the casing serves another purpose to be described later. The terminals of the coil 21 are connected to terminal posts 23 and 24 to which head phones 25 located outside of the casing may be connected by suitable conductors.

In the operation of the device, the latter is connected to a source of current and a magnetic field established by coil 10. The operator then puts on the head phones and moves the device over the area where the metal objects are known to be concealed. When the movement of the device causes a part of the flux in the field produced by coil 10 to be intercepted by the concealed object, the field is distorted, and current induced in the secondary coil 21. This causes a signal in the phones and by moving the casing about until the signal reaches its maximum intensity, the location of the object is determined. A pencil, crayon, or the like is then passed through the casing through openings 12 to mark the spot on the surface nearest the object.

I claim:

A device for detecting hidden metal, comprising a casing having a flat bottom surface, a coil within said casing having its axis normal to the bottom surface of said casing, said coil having an open core and said casing having openings in the walls thereof in alignment with said open core, a second coil within the casing lying at one side of said first coil and with its axis substantially parallel to the surface to be tested, and means for detecting current flowing through said first coil.

In testimony whereof I affix my signature.

GLENN E. BLINN.